April 16, 1946.   C. W. ABBOTT   2,398,398
HEATING APPARATUS
Filed April 21, 1943   4 Sheets-Sheet 1

INVENTOR
CHARLES W. ABBOTT.
BY William T. Kiesner
ATTORNEY

April 16, 1946.  C. W. ABBOTT  2,398,398
HEATING APPARATUS
Filed April 21, 1943  4 Sheets-Sheet 2

INVENTOR
CHARLES W. ABBOTT.
BY
William T. Kuesner
ATTORNEY

Patented Apr. 16, 1946

2,398,398

UNITED STATES PATENT OFFICE 2,398,398

HEATING APPARATUS

Charles W. Abbott, Larchmont, N. Y.

Application April 21, 1943, Serial No. 483,834

16 Claims. (Cl. 154—37)

This invention relates to a gas burner type of heating or burning apparatus.

One of the objects of this invention is to provide a simple, practical and efficient gas burner construction that will be capable of producing precisely defined or cross-sectioned flames for effecting heating or burning in or throughout the desired or intended rather precisely defined areas of materials, such as various sheet materials. Another object is to provide a gas burner of the above-mentioned type in which variation or change in the areas or widths throughout which the material is to be treated or burned may be controlled or determined in a simple, flexible, readily operable and efficient manner. Another object is to provide a gas burner construction of the above-mentioned type that will have a wide flexibility of change while retaining accuracy of precision of action, to meet varying requirements in practical use. Another object is to provide a gas burner construction of the above-mentioned type that will have a wide adaptability or application to various uses.

Another object is to provide a practical and effective apparatus for producing flame by combustion of suitable combustibles and capable of such precision of demarcation or definition of flame production as will effect heating or burning action upon sheet substances or materials in correspondingly accurately defined locations or areas throughout the substances.

Another object is to provide a dependable, efficient and readily controllable means for producing heating or burning effects in accurately-defined strip-like or band-like areas of moving web or sheet materials. Another object is to provide an apparatus of the just-mentioned character which will have ease and facility of control or of rearrangement to meet varying practical requirements as to such factors as the number of band-like areas, their respective widths, their spacings one from another, and the like.

Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which are shown several of various possible embodiments of the mechanical features of my invention:

Figure 10 is a vertical transverse sectional view as seen along the line 6—6 of Figure 4 showing a possible modified form of construction and assembly;

Figure 11 is an elevation as seen from the right in Figure 10;

Figures 12 and 13 are isometric rear and front views, respectively, on an enlarged scale, of a modified form of flame-defining element used in the form of Figures 10 and 11;

Figures 12a and 13a are, respectively, rear and front isometric views of the part shown in Figures 12 and 13 having assembled thereto a spacer element in Figure 12a and an orifice-modifying element in Figure 13a;

Similar reference characters refer to similar parts throughout the several views of the drawings.

Figures 1, 2, 3:
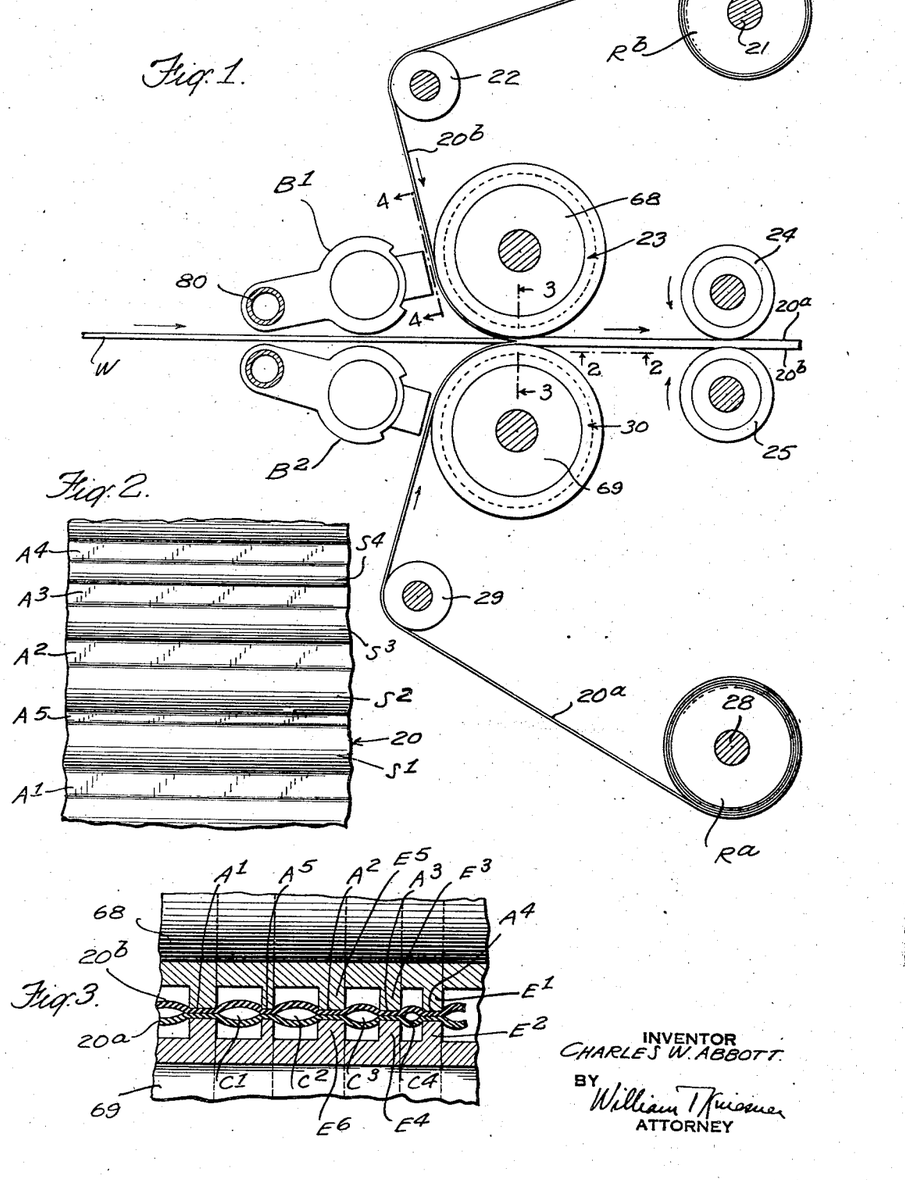
Figure 1 is a diagrammatic showing of an apparatus embodying burner construction according to my invention, to illustrate one of various applications thereof.
Figure 2 is a fragmentary plan view of a part of a web or sheet material, as seen along the line 2—2 of Figure 1, indicating possible and illustrative actions of my burner construction.
Figure 3 is a fragmentary vertical transverse sectional view as seen along the line 3—3 of Figure 1 showing one of the various ultimate objectives toward the achievement of which my heater or burner construction may be employed.

As conducive to a clearer understanding of certain features of my invention, reference may first be made to Figure 2 of the drawings in which I have shown at 20 a portion of a sheet or web material which may be of any desired length or width and of any desired or suitable material according to the kind of heat treatment, such as fusing, softening, or the like, that is desired to be performed upon it, and I have assumed that this material is to be subjected to treatment throughout strip-like or band-like longitudinally-extending and spaced zones or areas which may be of the same or differing widths and which may be equidistant from each other or differently spaced from each other. Thus let it be assumed, for purposes of illustration, that the strip or band-like areas $A^1$ and $A^2$ are of equal widths, areas or zones $A^3$ and $A^4$ are of equal widths but narrower, and the area or zone $A^5$ is still narrower and that the spacings $S^1$ and $S^2$ are to be equal, the space $S^3$ is to be less, and the space $S^4$ is to be still less. As illustrative of a web or sheet material which is in composition of such a nature that heat treatment, as for softening it up or making it plastic along zones or strip-like areas like $A^1$, $A^2$, $A^3$, etc., is desired, let it be assumed that the web or at least one face of it is made of a composition which may be pliant and non-tacky at ordinary and working temperatures but which can be made tacky and hence flowable or plastic upon heating to or above an appropriate temperature. Such a heating operation might be resorted to for the purpose, for example, of adhesively applying such a sheet material to another sheet or part or for the purpose of sealing together two such sheet materials, and in Figure 3 I have illustrated this last-mentioned objective or purpose in showing two such webs or sheets $20^a$ and $20^b$, with the one overlying the other, and with the two of them joined or sealed together along their respective and correspondingly dimensioned strip or band-like zones $A^1$, $A^2$, $A^3$, thus to leave intervening completely closed longitudinally extending channels or spaces $C^1$, $C^2$, $C^3$, etc., which may function for the reception therein, preferably during the bonding or sealing together operation of suitable or desirable elements, such as electrical conductors (not shown). In this latter illustration, the material of the sheet or web may be any suitable thermoplastic substance of which a good example is a synthetic rubber comprising a plasticized vinyl chloride polymer, such as those known and available on the market as "Koroseal," "Flamenol," "Korogel," or by way of further illustration, a material like poly-vinyl acetate, known under the trade name "Formvar," or poly-vinyl chloride-acetate, such as is known under the trade name "Vinylite," or isobutene polymers, such as is known under the trade name "Vistanex."

Such materials, when suitably compounded and plasticized, soften up or become plastic when heated and if pressed together when thus made plastic, they virtually fuse or melt together and upon cooling are found to be virtually integral, the bond or junction being strong and secure.

In any such cases, in the heating of thermoplastic sheet materials for such purposes as the above, it is desirable that the application of flame or heat to the web material, during its longitudinal movement at suitable speed, be controlled or controllable with a nicety or precision to insure treatment in the desired band-like strips or areas $A^1$, $A^2$, $A^3$, as in Figure 2, and where two such materials are to be mated together as in Figure 3 such precision is desirable to achieve uniformity of junction or bond. In such cases also it is desirable to provide for speed and facility of rearrangement as to widths of the zone or band-like areas $A^1$, $A^2$, $A^3$, etc., and for change in the spacings $S^1$, $S^2$, $S^3$, etc., according as changes in the requirements or in the objectives sought may dictate. For example, where electrical conductors are to be sheathed as in the other above-mentioned illustration, a wide variety of changes in widths of band-like areas and of the spacings, including uniformity in both, may be needed according to, for example, varying diameters or sizes of conductor usually stranded, that is to be employed, or even in equality of such diameter where for other reasons equal or varying spaces might be necessary. One of the dominant aims of this invention is to provide a method and apparatus for efficiently meeting in practice such varying requirements.

It is preferred that the web or sheet material be moved relative to the burner element and, depending upon the composition of the web material, various relationships of parts may be provided to effect such movement of the web material, preferably lengthwise in its own plane and into operative relation to the heater or burner element and, where several web materials are to be joined together, such a web-feeding or web-moving mechanism may be duplicated and suitable means, as later described, provided to press the heated and plastic band-like areas of the two web materials together to join them; for purposes of illustration, it is this latter form of apparatus that I have selected to show diagrammatically in Figure 1.

In Figure 1, the web material, usually available in the form of rolls, may have its roll rotatably supported as by a shaft 21, in turn suitably supported for demountability to permit removal or replacement of the roll by means not shown. The web material $20^b$ of the roll $R^b$ may be fed around a suitable guide roll 22 and in relation to a roll or drum 23, thus giving, between the guiding elements 22 and 23 a moving reach of the web $20^b$ transversely of which it is held in any suitable way, even by its tautness as it moves against deflection and hence in a plane and positioned in suitable proximity to this reach or portion of the web $20^b$ is a burner or heater unit $B^1$ embodying features of construction later described and capable of heat-treating the moving web in accurately defined transverse regions. Any suitable means may be employed to effect continuity of movement of the web material past the element $B^1$, such as capstan rollers or drums 24—25 driven by any suitable means at an appropriate surface speed to move the web in the direction of the arrow indicated in Figure 1 and past the element $B^1$.

Where the composition of the web is such that two similar webs are to be secured or sealed together along longitudinally extending band-like areas but transversely spaced from each other as above described in connection with Figure 3, another roll $R^a$ of the material may be supported rotatably as by a demountable shaft 28 and its web $20^a$ fed over a guide roller 29 and over a roller or drum 30 companion to the drum 23, and in such case drums 23 and 30 are constructed as later described herein to act also as presser elements to press and join together the two webs at their respectively mating heated band-like areas, the resultant joined-together webs emerging to the right from the drums 23 and 30 and together passing through the capstan or driving feed rollers 24 and 25 and where the channels or spaces $C^1$, $C^2$, $C^3$, etc. (Figure 3) have elements such as electrical conductors embodied therein, the rollers 24 and 25 may conveniently be provided with yielding surface material such as rubber or the like, so that they may conform themselves to the corrugated-like external faces of the resultant structure and effect distributed frictional driving grips upon the external faces of the two now-joined-together webs; the conductors or other elements to be thus encased in the channels $C^1$, $C^2$, $C^3$, would thus also be pulled along and hence to the right as viewed in Figure 1, and for purposes of illustration, I have indicated diagrammatically at W the conductive or other elements being fed, toward the right, in between the two webs, one for each channel, $C^1$, $C^2$, $C^3$, etc., as may be necessary.

Furthermore, since practical requirements might in instances demand that the conductors W be of different diameters or sizes, thus requiring different sizes of channels $C^1$, $C^2$, $C^3$, etc., the use of such conductors is a good illustration of why the spacings $S^1$, $S^2$, $S^3$, etc., might have to be made of correspondingly differing widths and also why the band-like areas $A^1$, $A^2$, $A^3$, etc., may have to be made of differing widths, for it will now be apparent that for larger conductors, the spacings $S^1$, $S^2$, etc., have to be correspondingly greater to adequately envelop the conductors and it is desirable that the widths of the band-like areas $A^1$, $A^2$, etc., in such cases, be also greater in order to more securely seal or fasten together the two halves of the channel-forming jackets, while with smaller diameters or sizes of conductors or other elements that might be employed, these various widths can be correspondingly less.

The two webs $20^a$ and $20^b$ may thus be fed or moved at any suitable rate, the one in relation to one burner or heater unit $B^1$ and the other in relation to another and preferably identical unit $B^2$, and since these units are preferably of identical construction, only one of them need be described in detail.

Figure 4:
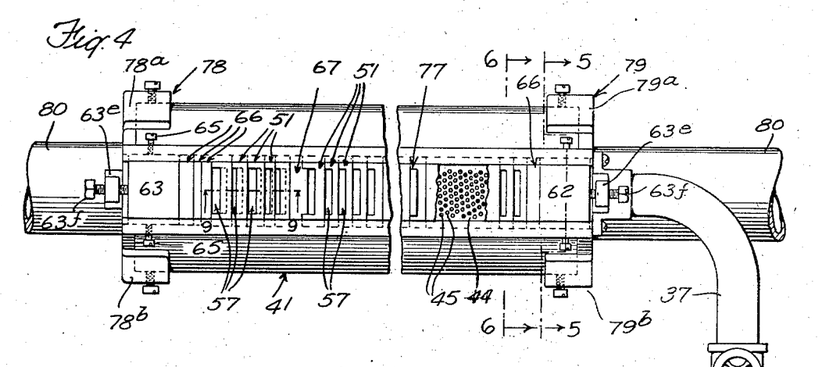
Figure 4 is an elevation as seen along the line 4—4 of Figure 1 of an illustrative form of burner construction.

The burner and heater unit is preferably of the type that produces heat by the combustion of a suitable combustible, preferably in gaseous form, such as ordinary illuminating gas, and in Figure 4 I have diagrammatically indicated a conduit 32 with a valve 34 therein, leading from a suitable source of supply of such gas; any suitable means, if necessary, to supply air or oxygen may be used and illustratively I may employ a so-called carburating apparatus indicated at 33. The carburating apparatus 33 may be of any suitable construction, usually motor driven as by a motor 35, for mixing air with the gas in suitable proportions to provide for ultimate appropriate combustion, as by a blue flame, and it may also embody any suitable pressure regulating means. A conduit 37 leads to the burner and heater unit, preferably through valve 38.

Figure 5:
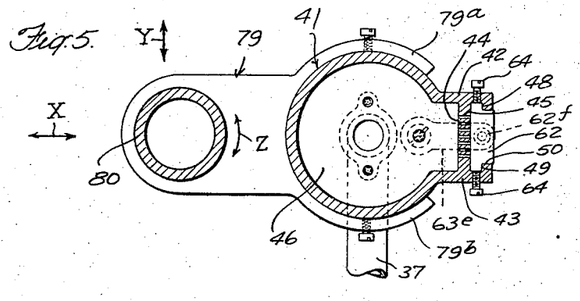
Figure 5 is a transverse vertical sectional view as seen along the line 5—5 of Figure 4.

Unit $B^1$, shown in Figure 4, comprises preferably a tube-like housing 41 of suitable dimensions, say, on the order of an internal diameter as viewed in Figure 5 of about 3 inches or so; housing 41 may be of any suitable length, preferably of a length commensurate with the width of the web to be heat treated, and when embodied in an apparatus is preferably of a length just greater than the maximum width of web that can be handled in the apparatus. It is at one end of the housing 41, the left hand end as seen in Figure 4, to which the conduit 37 is connected, preferably by a section of flexible tubing $37^a$ to allow for a suitable range of adjustment of the unit relative to the path of travel of the web upon which it is to operate.

Along that side or face of the housing 41 relative to which the web is fed or moved, the housing 41 is shaped to provide preferably a plane face (the right hand face as seen in Figure 5) and a convenient way of making this provision is to give the housing 41 a cross-section somewhat as shown in Figure 5 from which it will be seen that the otherwise curved wall of the housing has two parallel extensions 42 and 43 intermediate the ends of which the wall 44 bridges across them. The just-described several portions are preferably integral one with another, and in wall 44 there are drilled numerous holes 45, forming multiple gas ports through which gas from the interior of the housing 41 may flow toward the observer, as viewed in Figure 4, and toward the right as viewed in Figures 5 and 6, the end of the housing 41 opposite its connection to the conduit $37^a$ being closed in any suitable way as by an end wall 46.

Figure 6:
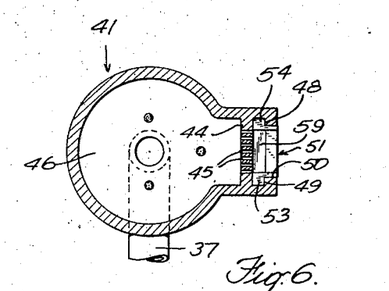
Figure 6 is a transverse vertical sectional view as seen along the line 6—6 of Figure 4.

Holes 45 are preferably uniformly distributed throughout the extent of the wall 44 and if the gas emitted therefrom is lighted, there is effected a multitude of individual flames, one from each hole 45, extending across the entire exposed face of the wall 44, as viewed in Figure 4, and if it is desired that these individual flames merge one with another, the factors of size and proximity to each other of the holes and the gas pressure are suitably related as will be understood by those skilled in the art, and in such case the effect of a continuous flame of a width equal to the vertical dimension as seen in Figures 4 and 6 and of a length equal to the horizontal dimension as seen in Figure 4 results. A suitable or convenient size and distribution of the holes 45 may comprise holes drilled with a #58 drill, spaced horizontally, as viewed in Figure 4, from each other to provide about twelve to the inch and spaced vertically, where the vertical dimension of the face of wall 44 is about 0.75 inch, to provide about eight holes and hence about eight longitudinal rows. Preferably also, and as indicated diagrammatically in Figure 4, the holes of successive longitudinal rows are staggered so as to provide transverse rows that are inclined.

In the form shown in Figures 5 and 6, I provide, just to the right of the outer face of wall 44 and in the inner faces of walls 42 and 43 longitudinally extending slots 48 and 49, so as to form, with the spacing between the wall extensions 42 and 43 what are in effect a T-slot when viewed from the left in Figures 5 and 6, and for convenience this T-slot is in its entirety hereinafter referred to by the reference character 50. The T-slot is preferably open-ended at both ends of the structure as viewed in Figure 4, not only to facilitate its manufacture but also to facilitate the insertion therein and setting of block-like flame or burner control elements, to overlie the ports 45 in the wall 44.

Figure 7:
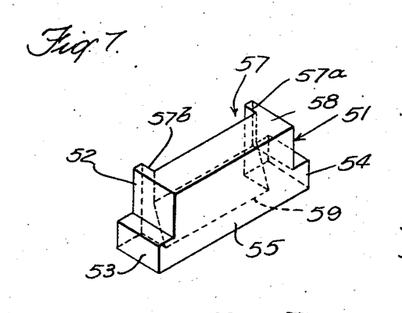
Figures 7 and 8 are, respectively, rear and front isometric views, on an enlarged scale, of one form of flame-defining element.
Figure 8:
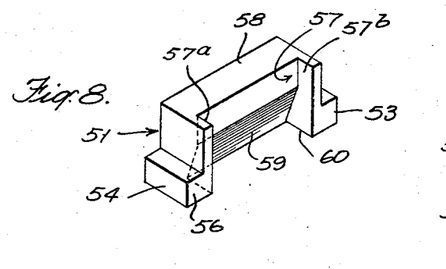

In Figures 7 and 8, I have shown one form of such elements and in this form the element generally indicated by the reference character 51 is in the form of a main body or block-like portion 52 having a height about equal to the depth of the slot 50 (Figures 5 and 6) and having lateral extensions 53 and 54 that neatly interfit with the slots 48 and 49, whereby as many elements 51 as are needed may be assembled to the burner construction by simply sliding them, in appropriate sequence where they are differently shaped as is later described, into the T-slot 50, so that the desired sequence of them overlies the ports 45.

The elements 51 are constructed to provide, in the sequence as assembled to the burner construction, gas ports, at which the gas burns, of the desired shape or size and of the desired spacing one from the other. A convenient way of constructing the elements 51 for this purpose is to let them have one face, such as face 55 of Figure 7, and hereinafter called the "rear" face, substantially plane and to provide in the opposite face 56 (Figure 8) hereinafter called the "front" face, a slot 57 that extends from the top face 58 downwardly to about one-half the vertical dimension of the element 51, whence the slot flares or widens out in a direction toward the rear face 55, as at 59 (see also Figure 9), to intersect the bottom face 60 in a dimension greater than the dimension at which the upper end of the slot 57 intersects the top face 58. In the illustrative form, the slotting is rectangular in cross-section as appears from both Figures 7 and 8 and this may conveniently be achieved as by milling.

The smaller dimension of the slot 57, where it intersects the top face 58, is equal substantially to the width of the band-like area throughout which the web is to be heat-treated and, as above described in connection with Figure 2, this width may vary. Accordingly, elements 51 are made up, some with slots 57 of one width, such as the width of band portion $A^5$ of Figure 2, some with slots 57 that are of a different width, others with slots 57 of still different width, and so on. And for different spacings $S^1$, $S^2$, $S^3$, etc., of Figure 2, the elements 51 are made up not only with different widths of slots 57 but also with different lengths in the direction from the front face 56 toward the rear face 55, according to the different spacings $S^1$, $S^2$, etc., that have to be met with.

Accordingly, whatever combination of widths of band-like areas throughout which the web is to be heat-treated and spacings therebetween, correspondingly slotted and dimensioned elements 51 are assembled in the T-slot 50 (Figures 4 and 6) in the desired sequence, and if the sequence is of a length to extend along the entire burner structure as viewed in Figure 4, anchor blocks 62 and 63 are slipped into the respective ends of the T-slot 50, being cross-sectioned to interfit therewith as shown in Figure 5, one of them, such as anchor block 62, is then set or locked in position as by set screws 64 and then the other one, such as block 63, after being pressed in a direction toward the opposite end in order to take up any play between successive elements 51 and in order to contact the latter snugly one with the other, is set or locked in place as by set screws 65. In this process of setting the inserted sequence of elements 51 in position, it will be seen also that the entire sequence as a unit may be shifted, adjusted or set lengthwise of the T-slot 50 where it is desired or necessary, as would be the case where the operation indicated in Figure 3 is performed, in order to align the differently dimensioned and differently spaced slots 57 with respect to the web or with respect to the pressure drums 23 and 30.

If the width of the web to be operated upon is less than the length of the burner and heater unit $B^1$, for example, of Figure 4, so that the sequence of elements 51 assembled to the unit is likewise less in length, the remainder of the length of the T-slot 50 is closed up with blanks or unslotted elements, preferably like the anchor blocks 62 and 63 which, as indicated in Figure 4, are preferably of greater length in the direction of the T-slot than are the elements 51. And it will now be apparent also that such blank members may be injected into the T-slot 50 where, for example, substantial spacings $S^1$, $S^2$, or the like, are needed or where transversely spaced sequences can be made operative upon the same or upon several webs.

Figure 9:
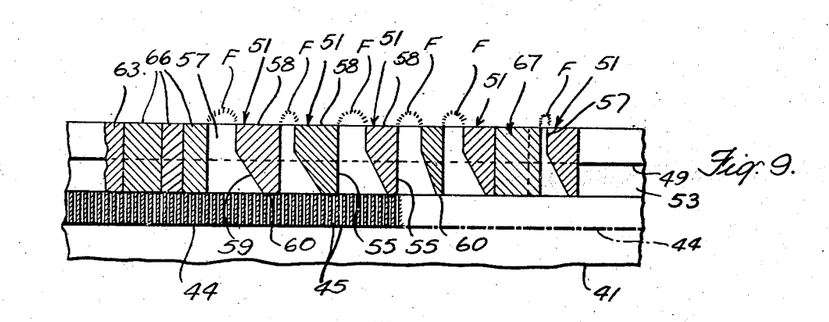
Figure 9 is a fragmentary longitudinal sectional view, on an enlarged scale, as seen along the line 9—9 of Figure 4, showing certain coacting relationships of various parts including several elements like that of Figures 7 and 8.

With a sequence of elements 51 thus assembled to a burner and heater unit, it being noted that the elements, including the anchor members 62 and 63 preferably rest upon the outer face of the apertured or ported wall 44 (Figures 5 and 6) of the burner unit, certain of the ports 45 in the wall 44 are closed over though, if desired, such closing off of certain of the ports need not be effected, depending upon the extent to which the lower portion of the slot in each element 51 intersects the underface 60, and in the illustrative embodiment of Figures 7–9, that can be made to depend upon the extent of the widening out or flaring as at 59. Thus, if the flare is zero, only those ports 45 that fall within the projection of the slot 57 feed gas to the latter while if the flare is a maximum, for example, 180° to the vertical as viewed in Figures 8 and 9, no ports 45 are covered over and all of them coact to feed gas conjointly to all of the slots 57 of the series. Any intermediate relationship may be effected and it is such an intermediate relation that I have selected for illustration in Figures 8 and 9.

The multitude of fine ports 45 have been found in practice, in conjunction with a substantially sized interior of the housing 41 (Figures 5 and 6) to achieve nicety or uniformity of gas emission throughout the whole area of the wall 44 that is apertured or provided with the ports 45 and I may thus utilize this effect in supplying the slots 57 with gas and hence it is preferable, where a flare as at 59 in Figures 8 and 9 is employed, to vary the angle of flare more or less according to the narrower dimension of the slot 57 so that the number of ports 45 feeding any one burner slot is roughly proportional to the area of the slot 57 itself.

When the gas emitted from the slots 57 is lighted, the gas, in burning, covers, with a blueish flame, the entire area of the slot 57, as indicated at F in Figure 9, being in horizontal cross-section dimensioned quite in accord with the rectangular shape and area of the slot 57 and being in vertical cross-section but very slightly rounded off, upstanding from all of the slots to substantially the same height or amount, as indicated in Figure 9, even though the widths of the slots 57 vary somewhat. Accordingly, the somewhat flattened tops of the flames F fall in substantially a single plane indicated in Figure 9 at P and because of the nicety of control that makes this possible, the web material to be operated upon can be by any suitable means guided for movement in a plane parallel to the plane P of Figure 9, in a direction or away from the observer viewing Figure 9, and spaced at any desired distance from the plane in which the top faces 58 of all of the elements lie, according to the kind or intensity of action desired upon the web material.

For example, where only the heat effect is desired, the plane of movement is again preferably parallel to the plane P and may be spaced farther away, according to the nature of the material of the web, where direct contact of the flame with the material is not needed or is for other reasons undesirable.

The direction of movement of the web material is, of course, parallel to the parallel longitudinal axes of the slots 57 and their correspondingly shaped flames F and the length of the slots and hence of the flames in that direction is such that, for the desired speed of movement of the web and the kind of action to be achieved thereon, any point in any of the band-like regions $A^1$, $A^2$, $A^3$, etc., of Figure 2, is subjected to the effect of the flame or its heat for a sufficient length of time to achieve the desired action.

By way of further illustration, where the two webs $20^a$ and $20^b$ of Figures 1 and 3 are of Koroseal and are to be joined together as above described and to give some idea of the precision with which the apparatus is capable of functioning, the smaller dimension of the slots 57 may all be 0.025 inch with a length in the direction of travel of the sheet material on the order of 0.625 inch, where all of the band portions $A^1$, $A^2$, $A^3$, of Figure 2, are to be of the same width, namely, about 0.025 inch; the height of the individual flames F may be about 0.187 inch and for a rate of travel of about 25 feet per minute for the web material, the spacing of the Koroseal web from the plane P of Figure 9 may be on the order of 0.125 inch. To illustrate two different widths of spacings, $S^1$, $S^2$, etc., of Figure 2, block-like elements 51, with the just-dimensioned slots 57 therein, were made of two lengths in the direction of the T-slot 50, being 0.280 inch and 0.405 inch. The desired softening, plasticity or mobility, could thus be given the two Koroseal webs $20^a$ and $20^b$ of Figure 1 to be dependably fused or flowed together by the flange-like presser portions of the presser drums 23 and 30, with the thickness of the web elements on the order of 0.015 inch. Satisfactory results were achieved with the spacing of the heater and burner units $B^1$ and $B^2$ of Figure 1 from the point where the presser drums 23 and 30 went into action of about 3½ inches. These results, moreover, were achieved even though one of the burner units, such as unit $B^2$ of Figure 1, is positioned with its flame-emitting face turned downwardly as generally indicated in Figure 1.

Where the processing indicated in Figure 3 is carried on, the drums 23 and 30 comprise companion flange-like or ring-like presser elements $E^1$—$E^2$, $E^3$—$E^4$, $E^5$—$E^6$, etc., respectively mating or juxtaposed as indicated and presenting peripheral pressure surfaces whose widths correspond substantially to the widths of the band-like areas throughout which the two webs are respectively heated by their respective burner units, and on the drums these pressure elements $E^1$—$E^2$, $E^3$—$E^4$, etc., are spaced axially according to whatever the spacings $S^1$, $S^2$, $S^3$, etc., of Figure 2 are to be. Preferably, these companion pressure elements are made up with hub-like or collar portions integral therewith, as shown in Figure 3, and are slipped onto respective shafts or cylinders 68 and 69, thus to make up the pressure drums 23 and 30 respectively. By such an arrangement, ring-like elements may be made up to match the dimensions of the flame-control elements 51 (Figures 7-9), so that, according to whatever sequences of differently dimensioned elements 51 are arranged on the burner and heater structures, corresponding ring-like pressure and spacer elements may be assembled onto the supporting drums 68 and 69 to make up the pressure drums 23 and 30 so that the companion heated band-like areas of the two webs $20^a$ and $20^b$, no matter what their respective widths or spacings might be, become operated upon and pressed together with their adjacent or contacting faces, plastic or flowable, and thus fused or flowed together, by correspondingly dimensioned and spaced pairs of pressure elements $E^1$—$E^2$, $E^3$—$E^4$, etc.; the latter pairs of presser elements will thus be seen to be respectively aligned along the path of movement of the web or webs with the respective slots 57 of the flame-control elements and hence with the correspondingly dimensioned and spaced flames burning at the slots as above described.

Emerging at the right in Figure 1 from the presser drums 23—30, the now-joined-together webs $20^a$ and $20^b$, appearing in cross-section somewhat as indicated in Figure 3 where elements such as electrical conductors are accommodated in the channels $C^1$, $C^2$, $C^3$, etc., the composite structure cools off or may be cooled by any suitable means not shown, whence the Koroseal or like material of the two webs that is flowed together returns to its normal condition and characteristics of toughness, pliancy, and the like, the junctions being strong and secure and the material of the two webs at the junctions is practically unitary or integral. The pressure applied by the presser drums 23 and 30, effected by any suitable adjusting means (not shown) for setting the spacing between the presser elements of the drums is such as to be effective to flow the material of the two webs together and, where the thicknesses of the two webs are equal, this adjustment or pressure may be such as to make the spacing between pairs of presser elements like elements $E^1$ and $E^2$ about equal to one-half of the sum of the thicknesses of the two webs. This action may effect some lateral flow or movement of the plastic material undergoing pressure and may contribute toward bulging the web material that intervenes successive pairs of presser elements, such as the portions of the web material that form the channel $C^4$ of Figure 3, away from each other somewhat as indicated in Figure 3. To accommodate such action where desired and to accommodate also the increased thickness where elements such as conductors are fed into the channels, such as channel $C^4$, the radial dimension of the collar or hub portions of the ring presser elements $E^1$, $E^2$, $E^3$, etc., is made preferably sufficiently less to avoid application of pressure to the cold or intervening longitudinal portions of the webs.

Figures 7A, 8A:
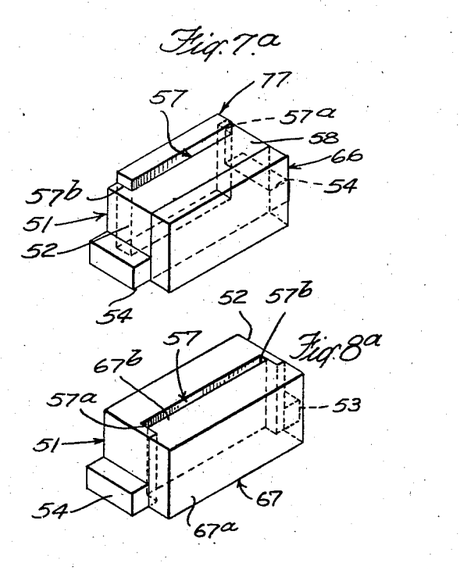
Figures 7a and 8a are, respectively, rear and front isometric views, on an enlarged scale, of the part shown in Figures 7 and 8, showing how certain other elements may be related thereto for changing the relationships or functioning of the flame-defining elements.

The above illustrates one way in which various flame widths and spacings may be achieved; according to that way, it might be necessary to have made up a relatively large number of differently shaped or dimensioned elements 51, depending upon the range of change of flame widths and spacings desired. I may, however, simplify that procedure and lessen the cost of manufacture of the elements by utilizing only one standard shape of element 51, thus achieving uniformity of construction of all of the elements 51, or use only several differently dimensioned standards or shapes of elements 51 (instead of a very large number as indicated above) and employ in coaction therewith spacer elements 66 and 67 of the kind shown in Figures 7ᵃ and 8ᵃ, respectively.

Spacer element 66 preferably comprises a block substantially in the form of a right-angled parallelepiped which has a height equal to the height of the main body portion 52 of the flame control element which for better illustration of this and other relationships is reproduced in Figure 7ᵃ and placed back to back with the spacer element 66; the latter has front and rear faces matching the rear face 55 (see Figure 7) of the element 51 excepting that the latter is devoid of lateral extensions corresponding to the extensions 53 and 54 of the element 51.

Element 66 is a simple form to manufacture and may be made up in different thicknesses and, referring to Figure 4, when different spacings are required, one of the anchor blocks 62 or 63 is loosened up and spacer elements 66 of the desired thickness or thicknesses are interposed between successive flame control elements, being simply slid into the slot 50 (see Figure 6) to come to rest with their bottom faces resting upon the face of the wall member 44 (see Figure 9) just as do the elements 51 themselves. These spacer elements 66, being devoid of the lateral extensions like parts 53 and 54 of the flame control elements 51 can thus be easily and readily put into place without having to slide the elements 51 out of the T-slot 50.

If change in width of the flames produced by orifice-forming slots 57 is desired, elements 67 are in a generally similar manner slid or injected into place, and these elements 67 comprise a main body portion 67ᵃ that is a parallelepiped and a portion 67ᵇ that is also substantially a parallelepiped but is dimensioned to be received snugly between the faces 57ᵃ and 57ᵇ (see also Figure 8) of the slot 57. In Figure 8ᵃ one such orifice-changing element 65 is shown in relation to a flame control element 51 to show how the portion 67ᵇ thereof is received into the slot 57 which it narrows up to the extent of the dimension of the portion 67ᵇ, thus diminishing the width of the orifice.

Figure 9A:
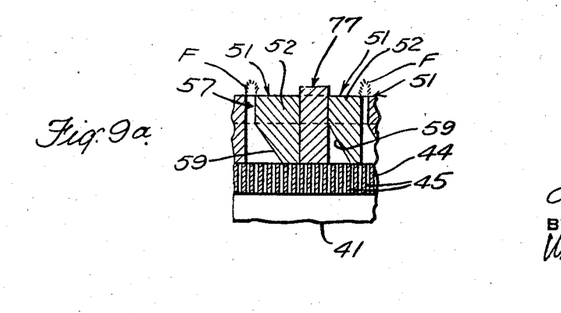
Figure 9a is a fragmentary view in section as seen along the line 9—9 of Figure 4 showing a flame-stopping element related to the burner construction.

In Figure 9ᵃ, being a sectional view of the same type as Figure 9, I have shown several flame control elements 51 aligned in the slot 50 with several spacer elements 66 and several orifice-changing elements 67 interrelated thereto in the manner above described. The parts 66 and 67 are, respectively, interchangeable and according to how many different dimensions that these parts are made up, corresponding changes in orifice widths and in flame spacings may be effected. For greater spacings, several elements 66 may be inserted between two otherwise successive flame control elements 51, as will now be clear.

The flame control elements 51 of Figures 7 and 8 may be given other forms or shapes according to circumstances and their mounting relative to the gas chamber housing 41 may likewise be varied, within the spirit and scope of my invention. For example, and referring to Figure 10, instead of providing a T-slot like the T-slot 50 of Figures 5 and 6, as by undercutting or slotting the inside faces of the extension walls 42 and 43 as at 46 and 49 in Figure 5, the undercutting may be omitted, leaving a plane rectangularly cross-sectioned slot as indicated at 71 in Figure 10, in which case the flame control elements of Figures 7, 8 and 9 can be employed without the lateral tongues or flange portions 53 and 54 and hence may be shaped substantially as in Figures 12 and 13 where these same elements are indicated by the reference character 51ᵃ and are shown to be the same as the elements 51 of Figures 7 and 8 excepting that the tongue or flange elements 53 and 54 are omitted and excepting that, in the top face 58 I provide a transverse groove 72 which may be substantially semi-circular in cross-section and may be easily milled.

Figures 10, 11, 12, 12A:
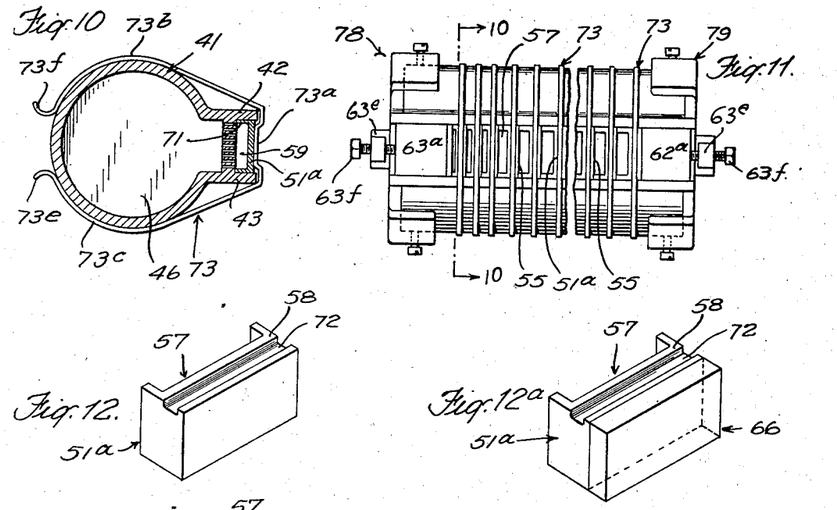

Such elements 51ᵃ, provided with differently dimensioned slots 57, differently dimensioned lengths, as was above described in connection with the elements 51 of Figures 7–9 may be simply set into the plane slot 71 in the desired sequence and secured in place by any suitable means.

Where a transverse slot 72 is employed, each element 51ᵃ may be provided with a fastening element that engages in the slot 72 and engages also the housing 41 and a simple and convenient fastening element may comprise a wire element 73 that has a straight depressed portion 73ᵃ that substantially fits into the slot 72 of the element 51ᵃ whence it is extended at either end as shown in Figure 10 to provide curved arms 73ᵇ and 73ᶜ that substantially envelop the housing 41 to hold the element 51ᵃ against movement out of the slot 71.

Preferably and conveniently, the fastening device 73 can be made of a suitable spring metal or alloy and so preshaped that its two arms 73ᵇ and 73ᶜ are resiliently urged toward each other, thus gripping the opposite curved faces of the gas chamber housing 41, resulting in a cam-like action that always tends to draw the element 51ᵃ inwardly of the slot 71, that is, toward the left in Figure 10.

Thus, each element 51ᵃ may be quickly assembled to the housing 41 or disassembled therefrom, the sequence of elements 51ᵃ may be readily assembled and readily changed, and it will be noted that, for example, should it be necessary to change only one or several at a point or points intermediate of the ends of the burner unit, they may be easily removed and replaced individually without having to slide all of them out of the structure as would be the case with the form shown in Figures 6–8. For this purpose the extreme ends 73ᵉ and 73ᶠ of the two spring arms are preferably elongated and curved over to provide easily grasped finger grip portions by which to separate the spring arms sufficiently to permit the fastening element 73 to be displaced out of the slot in the element 51ᵃ and to be displaced lengthwise along the housing 41, thus to permit the element 51ᵃ thus released to be lifted out of the slot 71, all as will be clear from Figures 10 and 11.

If desired, the endmost elements in the slot 71, like the anchor elements 62 and 63 of Figure 4 and 5, may be similarly fastened in place as by fastening devices 73, and in Figure 11 these end elements are indicated at 63ᵃ and 62ᵃ held in place by the spring clip fastening element 73. Preferably the fastening is supplemented in a manner later described.

The elements 51ᵃ just above described may, however, also be treated or used in coaction with spacer elements and orifice-changing elements like the parts 66 and 67 above described in connection with Figures 7ᵃ and 8ᵃ and in Figures 12ᵃ and 13ᵃ I have shown such parts 66 and 67 related, respectively, to the above-described flame control elements 51ᵃ and in view of the description of their use in connection with parts 51, as in Figures 7ᵃ, 8ᵃ and 9ᵃ, the manner of use or application thereof in the construction of Figures 10 and 11 will now be equally clear and need not be described in detail.

In either case, the inserted elements 66 and 67 are sufficiently securely held in the slot (either slot 50 of Figure 6 or slot 71 of Figure 10) by the frictional grip or clamping effect which the elements 51 or 51a, as the case may be, have upon the inserted parts. However, these effects may be supplemented, if desired or necessary, by any suitable means for clamping the aligned flame control elements with or without spacer or other elements (like parts 66 and 67) together, substantially as a unit.

Figure 4A:
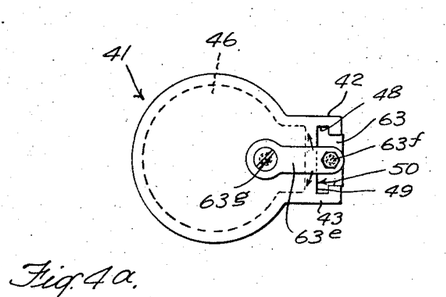
Figure 4a is an end elevation as seen from the left-hand end in Figure 4 of the burner per se, certain parts being omitted.

One such possible arrangement is shown in Figures 4 and 4a where I have shown two arms 63e and 62e suitably secured, preferably movably, to the end walls 46 of the chamber-forming housing 41, the arms having portions overlying the ends of the slot that receives the flame control elements, and in those portions are screws 63f and 62f respectively which, as shown in Figures 4 and 4a, can be brought into engagement with the end or anchoring blocks 63, 62, respectively, to tighten up or compress and clamp together as a unit all of the elements aligned in the slot. These screws 63f and 62f may also be employed to achieve what is in effect a micrometer adjustment of the aligned elements as a unit, with respect to the presser elements of the drums 68 and 69 of Figure 3.

The mounting of the arms 63e and 62e may comprise, in each case, a cap screw 62g as shown in Figure 4a, thus mounting the arm pivotally so that it may be loosened up and swung about the screw 62g as an axis into or out of operative relation to the assembled or aligned flame control elements.

The above forms of flame control elements are embodiments illustrative of possible constructions where the housing 41 of the burner unit is or can be constructed with parallel extension walls 42 and 43 (see Figures 6 and 10) that extend beyond the outer face of the housing wall 44 that has the gas ports 45 therein. And to illustrate how certain features of my invention can be carried out where such an external slot is not or need not be provided, I may proceed according to the illustrative embodiment shown in Figures 14 and 15. In Figure 15, the gas chamber housing 41 has the wall 44 bridged across the walls 42 and 43 but these three elements terminate in a plane face 75 in the central longitudinal portion of which, corresponding to the wall 44, are the gas ports 45.

With such a construction I again provide flame-control elements to rest against the outer face of the wall 44 and capable of being arranged in any desired sequence, as before, and preferably these elements, generally indicated by the reference character 51b rest flatwise against the entire face 75, each is provided in one face with a slot 57 flared as may be desired as at 59, all as described in connection with Figures 7, 8 and 9, and for each of these elements 51b I provide a fastening or securing means which, illustratively, may take the form of a metal band 76 that envelops the housing 41. These band elements 76 may be integrally formed with their respective control elements 51b or they may be secured at opposite ends of the latter in any suitable way as by welding or the like.

Accordingly, as many units 51b—76, each comprising a flame-control element 51b slotted as above described and a securing element 76, as may be needed, and differently dimensioned as to length in the direction of the length of the face 75 and with slots differently dimensioned as circumstances may require, are sleeved onto the housing 41, all in the desired sequence, and as with the forms above described, they are brought together with their adjacent edge faces in snug contact, so that again the back face 55 of one flame control element completes the bounding or definition of the slot 57 of the next adjacent flame control element, giving in cross-section an arrangement like that shown in Figure 9. The assemblage is shown in Figure 14, and again endmost anchoring elements like the elements 62 and 63 of Figure 4 may be put into position in a similar way as indicated by the element 63b in Figure 14.

Flame control elements 51b of Figures 14 and 15 may also be treated, and made to coact with elements 66 and 67, in the manner above described in connection with flame control elements 51 and 51a, as will now also be clear without further detailed description. These parts need simply to be inserted between successive elements 51b of Figure 14, as is desired or as is necessary, the inserted parts becoming aligned with the elements 51b, since all of the parts rest against the face 75 (Figure 15). End clamping screws 62f and 63f, as in Figures 4 and 11, may, of course, also be and preferably are employed, as shown in Figure 14.

Whatever form of mounting of the individual flame elements (51, 51a, or 51b) is employed, the modification of the width of the orifice and modification of spacings between flames, when parts 66 and 67 are employed, will be seen to proceed in a manner best shown in Figure 9a in which, for this purpose, the structural relationships and modifications achieved are plainly and clearly shown.

Figure 14:
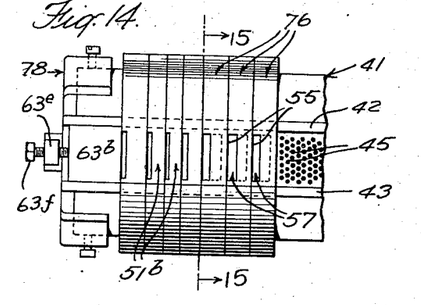
Figure 14 is a front elevation, fragmentary, of a modified form of burner construction.
Figure 15:
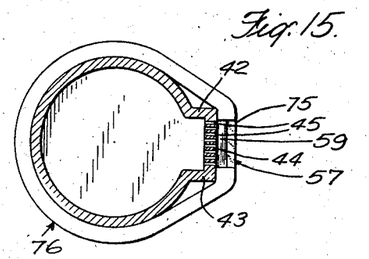
Figure 15 is a transverse vertical sectional view as seen along the line 15—15 of Figure 14.

In each of the forms described, it will be seen that the flame control elements define and provide respective orifices of the desired similar or dissimilar configurations and dimensions and of the desired similar or dissimilar spacings therebetween; the combustible gaseous mixture, flowing to these orifices from the gas chamber within the housing 41, burns at the outer ends (see Figure 9) of these orifices in flames which have the same configuration and dimensions as the respective orifices as viewed in Figures 4, 11 and 14, the gas pressure employed being regulated or adjusted by the apparatus 31 above described in connection with Figure 4 to give a height of flame above the aligned top faces of the flame control elements on the order, by way of illustration, of about ⅛ of an inch. In Figure 9 the cross-sections of the flames F, in a plane transverse to the longer dimensions of the orifices, is indicated and excepting for a slight rounding over the flames will be seen to be substantially flat-topped and thus contribute toward effecting uniformity of action throughout the widths of the band-like portions or areas $A^1$, $A^2$, $A^3$, etc., of Figure 2.

With substantially uniform gas pressure within the gas chamber of the housing 41, the volume of gas flowing to or through the respective orifices or slots 57 is substantially determined by the cross-sectional dimensions of the respective orifices themselves and thus substantial uniformity of height of the flames F, as viewed in Figure 9, results. Thus there is small risk of having one flame higher than another and having a greater effect upon the moving web than another.

However, depending upon relative sizes of orifices employed for operation upon the same web, such as where there is too great a divergence between areas of orifices, some compensation can be effected by changing the flare at 59 of the slots 57 in order correspondingly to vary or change the number of ports 45 in the wall 44 (see Figure 9) that supply gaseous mixture to any particular orifice or slot 57. For example, if a narrower orifice such as the one at the extreme right in Figure 9 shows a tendency to produce a flame taller than that of a wider orifice, the slope of the face 59 of the narrower orifice can be changed so that the number of ports 45 discharging into the orifice is lessened.

With the shape and dimensions of the various flames capable of nicety of determination as above described, it also follows that heating effects upon the moving web throughout regions corresponding to the spacings $S^1$, $S^2$, $S^3$, etc., of Figure 2 and which move over or above the top faces 58 of the flame control elements as viewed in Figure 9, are a minimum or not at all effective or are immaterial. I have found that the nicety of control of the flames F themselves and the substantial permanency of their shape make it possible to confine the effects thereof upon the web material to the band-like areas $A^1$, $A^2$, $A^3$, etc., and makes it possible to avoid having to place barriers between successive flames or to resort to some other expedient to guard the spacings $S^1$, $S^2$, $S_3$, etc., from undesired action upon the material thereof by the flames, though it will be understood that any suitable barrier or protective means may be employed if any particular circumstances or conditions such as low rate of movement of the web, higher temperatures of heating or burning, or the like, require resort to such expedients.

The above-described effect of effective concentration of the heating is well illustrated in the case of certain synthetic materials, above mentioned, such as Koroseal, where the heating along band-like areas $A^1$, $A^2$, $A^3$, etc., is effected to soften the material up and make it plastic for such purposes as sealing it to some other part as illustrated in Figure 3. Here I have found that, whereas the Koroseal sheet material has little, if any, substantial tensile strength when heated to substantial plasticity, the intervening unheated band-like areas corresponding to the spacings $S^1$, $S^2$, $S^3$, etc., of Figure 2, for example, are so little affected by the heat of the adjacent flames that the tensile strength of the material thereof remains, in turn, practically unaffected; in turn, these unaffected band-like areas can dependably take the strain or pull on the sheet material that accompanies the forced feeding movement thereof along, or over, or through the guide rollers, drums and the like, and these actions take place with such dependability and consistency that distortion, rupture or other determental effects are not caused in or upon the heated band-like portions $A^1$, $A^2$, $A^3$. As a result, relatively high speed of operation and dependability of result are accomplished.

I have above described various means for determining the flame widths and the spacings thereof. I may, however, also vary these effects by blocking off completely such orifice or orifices in the flame control elements as are appropriate to block off according to the spacings desired and for this purpose I have found a convenient and easily operable means in the form of elements, made of metal like the other parts of the burner structure, that are shaped to be snugly or even somewhat loosely received within the orifice to be blocked off. In Figure 7ª I have shown such an element at 77 and its relationship in blocking off an orifice is better shown in Figure 9ª from which it will be seen also that I prefer to have it of a height so that its bottom end rests upon the upper face of the wall 44 and its upper end projects beyond the top face of the flame control elements; this upper projection is preferred in order that the element 77 may readily be grasped by the fingers or a suitable tool for subsequent removal.

Figure 13:
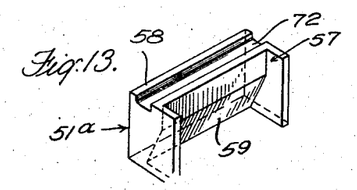
Figure 13A:
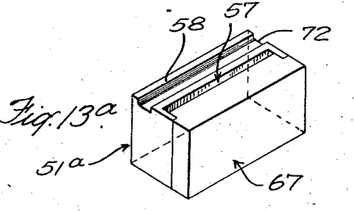

Accordingly, with a given array of aligned flame control and orifice-forming elements, whether they be of the form 51 of Figures 7–8 or of the form 51ª of Figures 12–13, or of the form 51ᵇ of Figures 14–15, and with or without spacer elements 66 above described and with or without the orifice-varying elements 67 above described, I may, with elements 77, block off any desired orifice or orifices and it will be understood that elements 77 may be provided in different thicknesses if desired, according to the cross-sectional dimensions of the orifices to be blocked off. Thus greater flexibility of arrangement of flame widths and spacings is achieved.

Where the element 77 is allowed to project upwardly beyond the top face of the flame control elements, it will, of course, be understood that the amount of such projection is preferably such as not to interfere with the web material being moved past or relative to the burner construction and its flames.

I have above described broadly that the web may be guided or moved, in substantially its own plane, past or relative to the multiple flame burner construction, by any suitable means appropriate to maintain the desired spacing of the web from the aligned tops of the flames. In the illustrative arrangement shown in Figure 1 and briefly above described, I prefer to fix this distance, preferably adjustably, by the spacing of the burner unit from the face of the pressure drum so that the web is actually in engagement with the drum as it passes into operative relation past the burner unit, and in Figure 1 the burner unit B¹, the web 20ᵇ, and the aligned peripheries of the pressure elements of the drum 23 are shown in the just-stated relation, as are also the burner unit B², the web 20ª and the pressure drum 30.

When so arranged, the above-mentioned spacing can be more precisely determined by setting the burner unit relative to the periphery of the pressure drum against which the tautness of the web securely holds the latter, thus in turn maintaining uniformity of spacing of the moving web from the flames or from the burner unit, and thus avoid possible interference with the uniform heating or burning action as might be caused if the web underwent any vibration or whipping.

In the specific illustration, where pressure rollers or drums are employed, this arrangement has a further advantage in that the variously dimensioned flame control elements and their orifices can be with greater nicety and ease aligned, not only into parallelism as a whole with the pressure drum periphery or peripheries, but also the spacing thereof as a whole from the drum can be more easily and precisely determined.

Such change in the spacing might be necessary, for example, where the thickness of the web material operated upon is changed or where, by way of further example, the intensity of the effect of the burner unit upon the web has to be varied as by varying the distance of the burner unit toward or away from the web, with or without a change in speed of movement of the web itself, as may be desired.

Any suitable means may be employed to mount the burner unit and, referring to Figures 4 and 5, I may, by way of illustration, support the burner housing 41 at its ends in, for example, arms 78 and 79 which may be shaped somewhat as shown in Figure 5, arms 79 being, in turn, secured to or mounted upon a suitable adjustable support, such as a shaft 80.

Shaft 80 may be supported by any suitable means, not shown, for adjustment, always parallel to the parallel axes of the guide rollers or drums, in directions preferably both vertical and horizontal as indicated by the arrows X and Y in Figure 5 and preferably also for adjustment about its own axis as indicated by the arrow Z.

With such adjustment, referring now to Figure 1, it will be seen that the burner unit B¹, for example, may be shifted toward or away from the path of movement of the web 20ᵇ and also lengthwise of or parallel to that path of movement, and by way of the rotary adjustment of the shaft 80, the plane of the orifice-bearing face of the burner unit may be set parallel to or even angularly to the plane of the web.

The burner housing 41 may be secured to the arms 78 and 79 in any suitable way, but preferably and conveniently by an arrangement such as that shown in Figures 4 and 5 wherein the ends of the arms 78 and 79 are in effect bifurcated as at 78ᵃ—78ᵇ and 79ᵃ—79ᵇ, companion arm portions being preferably internally machined to the same radius as the outside radius of the burner housing 41 to form a seat therefor as is better shown in Figure 5. These structural features may be so proportioned, if desired, as by leaving sufficient space between the outer ends of the arm portions greater than the peripheral dimension of the housing extensions 42—43 so as to permit the burner housing 41 to be adjustably set about its own axis relative to the supporting arms 78 and 79. Such an adjustment can thus add to the flexibility of adjustments provided for by the above-described adjustable mounting of the main supporting shaft 80 and may be used, for example, to get a final setting of parallelism between the web and the orifice-bearing face of the burner unit. Suitable means are employed to secure the burner housing 41 in the arms 78 and 79, such as set screws 80 (Figure 5).

The flexible portion 37ᵃ (Figure 4) of the conduit 37 will be seen to maintain the connection of the burner unit, during any shifting or adjustment of it, to the source of supply of combustible mixture.

It will thus be seen that there has been provided in this invention a burner and flame control structure in which the various objects hereinbefore set forth together with many thoroughly practical advantages are successfully achieved.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. An apparatus for heat-treating and securing together two plies of thermoplastic web material along transversely spaced longitudinally extending band-like portions of the web plies comprising means for guiding the web plies each along a predetermined path, gas chamber housing means extending transversely of said path and presenting to each ply a wall whose plane is substantially parallel to the plane of the web ply, said gas chamber housing means having means for supplying it with a combustible gas mixture and each of said walls having ports distributed therealong for the emission therethrough of gas for combustion, a plurality of flame-control elements aligned along each wall and overlying the latter and the ports therein and presenting respectively orifices of substantial length in the direction of movement of the web ply and of widths and spacings according to the width of the band-like areas and the transverse spacings thereof to be heat-treated in the web ply, means demountably securing said elements in position and alignment relative to the respective walls of said gas chamber housing means whereby to effect desired rearrangement thereof according to the desired width and spacings of said band-like areas, and means operating subsequent to the heat treatment of said plies, which gives the material thereof along said band-like portions plasticity, to effect pressing of said plies together at least along said substantially plastic band-like areas to join the plies together therealong.

2. An apparatus as claimed in claim 1 in which said elements are of individual dimensions in a direction transversely of the web according to the spacings desired between the band-like portions of the web to be treated.

3. An apparatus as claimed in claim 1 in which said orifices are formed by and between adjacent faces of successive elements.

4. An apparatus as claimed in claim 1 in which said orifices are formed by and between adjacent faces of successive elements, at least one of the contiguous ends of successive elements having means spacing its end face from the end face of the succeeding element to thereby determine the width of the orifice for flame production.

5. An apparatus as claimed in claim 1 in which said orifices are formed respectively by and between adjacent faces of succeeding elements, at least one of the adjacent faces being slotted or cut away in a shape and outline to form with the other of said adjacent faces the shape and dimensions desired for the orifice and the flame produced thereat.

6. An apparatus as claimed in claim 1 in which said housing wall is provided with means to either side thereof to form therewith a longitudinally extending guideway or slot, said plurality of elements having dimensions to be snugly received between said means and to be thereby aligned relative to said wall and the ports in the latter and to coact with said securing means.

7. An apparatus as claimed in claim 1 in which said housing is externally shaped to provide a T-slot of which the bottom face is said wall with the ports therein, said plurality of elements having means extending into the lateral extensions of said T-slot, whereby said elements are aligned relative to said wall and the ports therein.

8. An apparatus as claimed in claim 1 in which said securing means comprise a plurality of loop-like elements fitting substantially around said housing, one for each element, whereby each element with its loop-like element may be sleeved onto said housing and by the loop-like element held assembled and aligned relative to said wall and the ports therein.

9. An apparatus as claimed in claim 1 in which said securing means comprises a plurality of pairs of spring-like arms, one pair for each element, with the arms of each pair engageable laterally of the housing thereby to hold said elements assembled thereto.

10. An apparatus for heat-treating and securing a web of thermoplastic material along transversely spaced longitudinally extending band-like portions of the web comprising means including a drum for guiding the web for longitudinal movement, said drum having peripherally extending cylindrical faces of widths respectively substantially the same as the widths of the band-like portions of the web to be heat-treated and being axially spaced substantially according to the transverse spacing of said band-like portions of the web, burner means extending transversely of the path of movement of said web and having a plurality of orifices respectively juxtaposed to said cylindrical roller faces and of widths respectively substantially the same as the axial widths of said cylindrical faces and having spacings substantially the same as the spacings between said cylindrical faces, said burner means having means for connecting it to a supply of combustible for thereby producing at said orifices flames of respective widths and spacings substantially corresponding to the widths of said band-like portions of the web and to the transverse spacings thereof whereby the heat of said flames gives plasticity to the thermoplastic material of the moving web within the confines of said band-like portions thereof, and means for pressing said web in at least said band-like portions thereof and while the material is plastic against a member to thereby secure the web to the member along the regions of said band-like portions.

11. An apparatus as claimed in claim 10 in which the orifices of said burner means have substantial dimensions in the direction of the length of the web moving along said path to thereby lengthen, in the direction of movement of the web, the flame produced at each orifice.

12. An apparatus as claimed in claim 10 in which said drum comprises a cylindrical support having sleeved thereon a plurality of ring-like elements and spacer means, each ring-like element having thereon one of said cylindrical faces, whereby said drum may be made up to provide cylindrical faces of such widths and spacings as may be desired, and said burner means comprises orifice-producing elements with means demountably assembling them to the burner means to thereby provide flame widths respectively substantially commensurate with the widths of the cylindrical faces and substantially similarly spaced.

13. An apparatus as claimed in claim 10 in which said drum comprises a cylindrical support having sleeved thereon a plurality of ring-like elements and spacer means, each ring-like element having thereon one of said cylindrical faces, whereby said drum may be made up to provide cylindrical faces of such widths and spacings as may be desired, and said burner means comprises a plurality of orifice-providing elements with spacer means for spacing them and hence their orifices according to the transverse spacings of said cylindrical faces, with means demountably assembling said elements and spacers to the burner means.

14. An apparatus as claimed in claim 10 in which said drum comprises a cylindrical support having sleeved thereon a plurality of ring-like elements and spacer means, each ring-like element having thereon one of said cylindrical faces, whereby said drum may be made up to provide cylindrical faces of such widths and spacings as may be desired, and said burner means comprises a plurality of orifice-providing elements with means insertible into the orifices to change the dimensions of the latter and thereby provide flame widths respectively substantially commensurate with the widths of said cylindrical faces, and means demountably assembling said elements and insertible means to the burner means.

15. An apparatus as claimed in claim 10 in which said last-mentioned means comprises drum means coacting with said drum and the cylindrical faces of the latter to receive therebetween both said web and said member and to effect compression thereof by said axially spaced cylindrical faces of said drum to press the band-like portions of the web while still plastic into securing engagement with said member.

16. An apparatus for heat-treating and securing together two webs of thermoplastic material along transversely spaced longitudinally extending band-like portions thereof comprising web moving and guiding means including coacting driven drums between which the two webs pass in engagement with each other, and burner means extending transversely of the path of movement of the webs and operating in advance of their entry between said drums and providing two sets of transversely spaced orifices of widths and spacings according to the width of the band-like portions and the transverse spacings thereof throughout which the webs are to be secured together, said burner means having connections to a supply of combustible for thereby producing at said orifices flames of corresponding respective widths and spacings to thereby heat-treat the two webs to give the material thereof plasticity along said band-like portions, the plastic material of the two webs throughout the widths of said band-like portions being by said drums pressed together to effect junction between the two webs along said band-like portions.

CHARLES W. ABBOTT.